Oct. 20, 1953   R. I. EYLER   2,655,670
MACHINE TOOL AND OPERATING CIRCUIT THEREFOR
Filed June 30, 1949   5 Sheets-Sheet 1

FIG. 1

Inventor
ROY I. EYLER
By Strauch + Hoffman
Attorneys

Fig. 2B

Patented Oct. 20, 1953

2,655,670

UNITED STATES PATENT OFFICE 2,655,670

MACHINE TOOL AND OPERATING CIRCUIT THEREFOR

Roy I. Eyler, Waynesboro, Pa., assignor to Landis Machine Company, Waynesboro, Pa., a corporation of Pennsylvania Application June 30, 1949, Serial No. 102,363

6 Claims. (Cl. 10—107)

This invention concerns metal working machines and in particular machines for performing machining operations on widely separated portions of an elongated work piece, and control systems therefor.

The present invention is an improvement on certain features of the machine shown and described in the pending application of Harry L. Berkey and George E. Hieber, S. N. 747,756, filed May 13, 1947, for Automatic Pipe Machine. The control system of the machine described in the aforesaid application has been improved by replacing the mechanically-held electrical relays with relays of the ordinary type. This reduces the number of relays required by a considerable number, and permits a general simplification of the entire control circuit. Another advantage is that the failure to function of the mechanically-held relays may sometimes occur due to mechanical wear and such failure can cause the operating cycle to be confused. As a result, certain of the operations are performed out of their proper sequence, which may damage the machine. The use of the ordinary relay insures that the relay will, for instance, be held closed during the entire period of time required for it to be held closed. This is done electrically and by the same current which causes the hydraulic valves to function properly for the correct sequence of operations. For such a relay to fail to hold, it would be necessary for the current to fail, in which case the machine would stop. With the mechanically-held relays, on the other hand, it is possible for the relay to fail mechanically while the electric current continues to drive the machine, but in incorrect and erratic sequence.

To insure the proper and most efficient operation of the relays, an entirely new control system has been devised for the machine. This new and simplified control system has several other additional distinct and important advantages over that previously used, among which are the possibility of opening and closing either of the two chucks independently of the machine cycle for setting-up purposes, the possibility of causing either of the two carriages to move through their operating cycle while the rest of the machine is at rest and the possibility of causing either of the two machining units to move completely through one operating cycle and stop.

Accordingly it is an object of the present invention to provide an improved control circuit for a machine tool comprising a work handling unit and one or more work forming units, all of which are operated in timed relation with each other.

Another object of the invention is to provide such a control circuit which will effectively employ electrically-held relays in all cases to assure proper sequential operation of the various mechanisms at all times.

A further object of the invention is to provide a control system for a complex machine tool comprising one or more operating units and a work handling unit, which system is selectively useful for the automatic operation of the entire machine, for the operation of an individual unit of the machine or for the operation of a particular mechanism or portion of a unit.

Other objects and advantages will be apparent from the following description of the invention and from the accompanying drawings in which:

Figures 2A, 2B, 2C and 2D constitute a diagram of the hydraulic and electrical control circuit of the machine.

Figure 1:
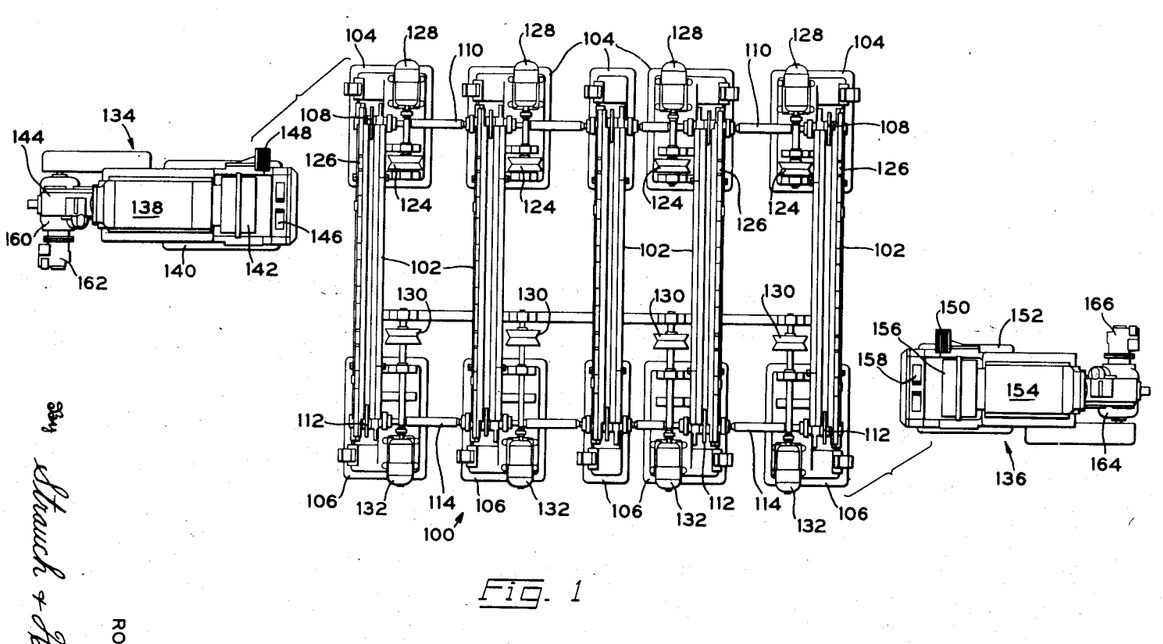
Figure 1 is a top plan view of the complete machine.

In Figure 1 the central unit 100 is the transfer table of the machine which serves to convey the work pieces successively to several index stations along the rails 102. Rails 102 are supported at both ends by a series of pedestals 104 and 106. A chain sprocket 108 is mounted in each rail at the end supported by pedestals 104. Sprockets 108 are arranged for rotation with and keyed to a shaft 110 which is made up of several short shafts coupled together to connect all of the sprockets 108 for unitary rotation. Sprockets 112 are mounted in rails 102 at the ends supported by pedestals 106 and are arranged for rotation with and keyed to a shaft 114 which is composed of several short shafts coupled together to connect all of the sprockets 112 for unitary rotation.

Each pair of sprockets 108 and 112 is connected by a chain 116 (Figure 2B) so that they all rotate in unison. Such rotation is intermittent and may be accomplished by means of one or more hydraulic cylinders 118 (Figure 2B) mounted in the interior of a rail or rails 102. The piston of cylinder 118 is secured to a member 120 having tooth-like projections 122 on one side which projections are adapted to engage simultaneously with several rollers of chain 116. Thus the actuation of cylinder 118 in the outward direction propels chain 116 and simultaneously rotates sprockets 108 and 112 and their shafts 110 and 114. When the piston of cylinder 118 is withdrawn rearwardly the toothed member 120 slides ineffectually on chain 116 and at the end of the stroke of the piston, engages another group of rollers in said chain preparatory for another propulsion of the chains 116. The number of members 120 driven by cylinders 118 will depend upon the number of rails 102. Where there are five of such rails, as in Figure 1, two members 120 will be sufficient. Chains 116 are fitted in known manner with suitable lugs which are employed to engage the pipe or other elongated work piece which rests across the top surfaces of the rails 102 and parallel with shafts 110 and 114. Thus the propulsion of chains 116 moves the pipe laterally for a predetermined distance equal to the stroke of cylinder 118, leaving the pipe at rest between outward strokes of said cylinder. The upper surfaces of the rails 102 are provided with depressions 126 into which the work piece falls after having been advanced by a stroke of cylinder 118. The distance between adjacent notches being equal to the length of a stroke of member 120.

A series of rollers 124 are mounted upon the pedestals 104. The depressions 126 in rails 102 permit the pipe being operated upon to be supported by rollers 124 when the pipe comes to rest at this particular index station. Rollers 124 are driven by motors 128 to carry the pipe axially to the left as seen in Figure 1. A similar set of rollers 130 are mounted adjacent the pedestals 106 to convey the pipe axially in the opposite direction, said rollers being driven for this purpose by the motors 132 mounted upon pedestals 106.

The above described transfer table is adapted to serve two work forming units, one of which, designated by the reference character 134 is located at the left side of the transfer table 100 as shown in Figure 1, while the other, indicated generally at 136 is located at the right side of said table.

Since the two work-forming units 134 and 136 are identical in construction and mode of operation a brief description of unit 134 should suffice for both. A complete, detailed description of these units may be found in the above-mentioned copending application. For exemplary purposes only, the units 134 and 136 are shown to be thread cutting machines. It should be understood that they may alternatively be machines for performing such preliminary operations as reaming, facing or taper-turning.

Unit 134 comprises a carriage 138 suitably supported by a bed 140 for sliding movement in a longitudinal direction, that is, perpendicularly toward and from the adjacent transfer table 100. A die head 142 and a taper producing mechanism 144 are supported at the front and rear ends respectively of the carriage 138. Forwardly of die head 142, bed 140 encloses a chuck 146 for gripping the end of the pipe while it is being operated upon by the die head 142. As described in the above mentioned application, chuck 146 employs grips which recede below the level of rails 102 so that a pipe may be introduced laterally into gripping position.

*Operation*

Briefly, the operation of the machine is as follows. The pipe or tube to be operated upon is introduced by any convenient means onto the transfer table 100 at the top of Figure 1 and is intermittently propelled as above described until it is supported by the rollers 124. These rollers 124 convey the pipe axially until it abuts against a work stop 148 affixed to the bed 140 of machine 134. At the next stroke of the index mechanism the pipe is carried to the following index station at which it is in substantial alignment with the axis of die head 142. At this point the pipe is automatically seized by the chuck 146 and held securely for the threading operation which is accomplished by the automatic advance of carriage 138 and the attached die head 142.

When the thread is finished, die head 142 opens automatically and is withdrawn rearwardly to clear the end of the pipe and permit the next indexing operation. The chuck 146 opens and the pipe is then moved intermittently in a downward direction as seen in Figure 1 until it rests upon the rollers 130. These rollers convey the pipe axially against a work stop 150 which is secured to the bed 152 of the right hand threading unit 136. With the extremity of the pipe thus located for the machining operation it is carried by the following index movement into substantial alignment with the carriage 154 and die head 156 of the right hand unit. At this position the pipe is seized by the chuck 158 and the above-described threading operation is repeated, this time on the right hand end of the pipe. Thereafter, by a further movement of the index mechanism the finished work piece is discharged from the machine at the bottom of Figure 1.

The control circuit shown in Figures 2A to 2D is arranged to perform the operation of threading upon the pipe and therefore includes the operation of a threading head. If units for other types of machining are to be used, the circuit shown is equally applicable with the elimination of those parts necessary for the opening and closing of the die head and leadscrew nuts. As in the above-mentioned copending application, the parts of the circuit which energizes the spindle motors, roll motors and coolant and lubricating pump motors is omitted here since that is all in accordance with standard practice and has no effect upon the control circuit shown.

In this diagram, to facilitate reading, the control relay coils have been designated as R6, R7 etc. These relays are all of the ordinary type and the contacts thereof are shown in their normal positions which they assume when the coil of the relay is not energized.

The contacts associated with each relay are given the same number as the relay but preceded by the letter C instead of R as C6A, C6B etc. It will be noted that most relay coils have more than one set of contacts. For instance relay coil R9 actuates three contacts which will be found in the circuits of solenoid S26A, relay coil R9 and relay coil R10. Limit switches are designated as LS8, etc. Manually operated switches are designated PB1, etc., for push button switches and SW1, etc., for knife switches. The solenoids included in the circuit are given a number preceded by the letter S and followed by either A or B as S23A, etc. The suffixes here designate opposite sides of the same valve so that if solenoid S23A is energized, the valve associated therewith will be set in one position and if solenoid S23B is energized, said valve will be set in the other position.

In order to facilitate the reading of the circuits shown in Figs. 2A–2D the various electric lines have reference numbers 400–430 applied to them where the particular lines run from one sheet of drawing to another. For example line 402 connects a contact LS8A on Fig. 2A to a contact LS13A on Fig. 2D.

The current for operating the controls is carried by the two wires designated L1 and L2. The control relays are connected in parallel across lines L1 and L2. After the various electric motors have been started, the cycle start button PB3 (Fig. 2C) or PB4 is pressed to close a circuit L1—PB16—PB15—PB3 or PB4—R7—L2, energizing relay R7. Energization of relay R7 opens contacts C7C and C7E and closes contacts C7A, C7B and C7D. Contacts C7C, C7D and C7E have no immediate effect on the cycle. Contacts C7B close a circuit L1—PB16—PB15—C7B—R7—L2 to provide a holding circuit for the energization of relay R7 when pressure on the switch PB3 or PB4 is released. The presence of the two switches PB3 and PB4 is due merely to the desirability of having one of these cycle start switches at each of the machining units so that the cycle may conveniently be started from either end of the machine. The normally closed switches PB15 and PB16 are for the purpose of stopping the operation of the machine without stopping the motors which drive the various parts of the machine. As will be seen later, the cycle will continue to its end before stopping after either switch PB15 or PB16 is pressed. As is well understood in the art, a master stop button may be installed in the motor circuits to stop the entire machine instantaneously in case of emergency.

Closing of contacts C7A closes a circuit L1—LS1A(Fig. 2B)—LS2—LS3—C7A—R6—L2, energizing relay R6 and closing the five sets of contacts associated therewith. Closing of contacts C6B closes a circuit L1—LS4B—C6B—LS2—LS3—C7A—R6—L2 to provide another circuit for energizing relay R6. The limit switches LS2 and LS3 are closed when the chucks are open and limit switch LS4 is closed on its contacts LS4B when the index mechanism is not fully extended, both of which conditions are present at this period in the cycle. Closing of contacts C6A closes a circuit L1—C6A—S29B—L2, energizing valve solenoid S29B.

As seen in Figure 1, the left hand machining unit 134 is driven by a motor 160 which is also employed to drive the attached two-pressure hydraulic pump 162. The right hand machining unit 136 is driven by a motor 164 which also drives the attached two-pressure pump 166. Pump 162 lifts hydraulic fluid from a reservoir 163 (Fig. 2B) and discharges it at low pressure into line 168 and at high pressure into line 170. Pump 166 lifts fluid from a reservoir 167 (Fig. 2C) and discharges it at low pressure into line 172 and at high pressure into line 174. Lines 170 and 174 lead to the sequence valves 176 and 178 respectively. These valves have no effect on the pressure or flow in the through lines 170 and 174 and their function is to permit fluid to pass into lines 180 and 182 respectively when the line pressure exceeds a predetermined value.

Lines 170 and 174 continue to regulate valves 184 and 186 respectively. As will presently be seen, lines 170 and 174 provide fluid for actuating the gripper mechanism so regulating valves 184 and 186 are provided to limit the pressure in lines 170 and 174 to a safe gripping pressure and to prevent crushing the pipe between the grips. Lines 170 and 174 lead, finally, to the distributing valves V28 and V25 respectively.

At the start of the operating cycle, the pistons of valves V28 and V25 are set to deliver fluid into lines 188 and 190 respectively. Lines 188 and 190 lead directly to the upper ends of cylinders 192 and 194 respectively, the pistons of which are attached to operating racks 196 and 198 respectively of the gripper mechanisms 146 and 158. Fluid existing under pressure in the upper ends of cylinders 192 and 194 hold racks 196 and 198 at the downward end of their strokes and thus the grips are held in open position.

Lines 168 and 172 connect respectively to the relief valves 200 and 202. Delivery lines 204 and 206 extend from valves 200 and 202 to check valves 208 and 210. Line 212 connects both valves 208 and 210 to the distributing valve V29. At the start of the operating cycle, valve V29 is set to deliver fluid through line 216 into the forward end 119 of cylinder 118, the piston of which is employed to operate the index mechanism, as described above. Fluid existing under pressure in the forward end of cylinder 118 holds the member 120 in retracted position. However, immediately after the start of the cycle of operation, as described above, the solenoid S29B is energized to shift the piston of valve V29. When this occurs, fluid is delivered through line 214 to the rearward end of cylinder 118 to start the index member 120 moving forward to its extended position, in the course of which movement the indexing chains 116 are propelled to carry the tubes being operated upon one station forwardly.

It should be noted that fluid from both pumps is used to actuate the index mechanism since a large volume of fluid is needed, especially if a number of indexing mechanisms are used. Slower operation can be obtained, however, by the use of either of the pumps if the other is, for any reason, not operating. The check valves 208 and 210 effectively close lines 204 and 206 for such operation. Thus it is seen that either threading unit may be operated together with the transfer table and without the other unit.

Line 204 connects with line 180 through a check valve 218 and line 206 is connected to line 182 by a check valve 220. Branches of lines 180 and 182 lead to the solenoid-operated spring-return valves V39 and V40 respectively. The energization of solenoids S39 and S40 will close valves V39 and V40 to prevent fluid from entering lines 222 and 224 respectively to shift the positions of the pistons of relief valves 200 and 202.

Line 180 delivers fluid under pressure to the distributing valves V26 (Fig. 2A), V27 and V30. The piston of valve V27 is initialy set so that fluid is delivered through a line 226 to the lower end of a cylinder 228 to maintain leadscrew nut 229 of threading unit 134 in open position. Valve V26 is designed to occupy a neutral position when neither of its solenoids are energized, which is the present case, so that all lines leading to it are closed. Thus fluid is trapped without pressure in lines 230 and 232 leading respectively to the forward and rear ends of carriage operating cylinder 234 and the carriage 138 remains stationary.

The line 182 delivers fluid under pressure to the distributing valves V23 (Fig. 2D), V24 and V31. The piston of valve V24 is set so that fluid is delivered through line 236 to the lower end of cylinder 238 to maintain the leadscrew nut 240 of threading unit 136 in open position. Valve V23, like valve V26, is closed when neither of its solenoids are energized and fluid is trapped without pressure in lines 242 and 244 leading respectively to the forward and rearward ends of carriage operating cylinder 246 and the carriage 154 remains stationary.

The beginning of the advance of the index mechanism described above operates limit switch LS1, opening its contacts LS1A and closing contacts LS1B. Opening of contacts LS1A opens the circuit L1—LS1A—LS2—LS3—C7A—R6—L2 but relay R6 remains energized by means of the above-mentioned second circuit through contacts C6B. The closing of contacts C6C closes a circuit L1—C6C—R16—L2 to energize relay R16 and close the four sets of contacts associated therewith. Contacts C16D have no immediate effect on the circuit. Contacts C16C close a circuit L1—LS1B—C16C—R16—L2 to provide a second circuit for energization of relay R16. The closing of contacts C16A and C16B closes the circuits L1—C16A—S39—L2 and L1—C16B—S40—L2 respectively, energizing solenoids S39 and S40. As explained above, these valves will then be set to close lines 222 and 224 and thus prevent "dumping" the hydraulic pumps through relief valves 209 and 292. This insures that the full volume of the pumps is available to operate the various cylinders, beginning with the index cylinder 118.

When contacts C6D close, they close a circuit L1—C6D—S30A—L2, energizing solenoid S30A which shifts the piston of valve V30 so that fluid passes from supply line 180 through valve V30 and line 248 into the forward end of a die head operating cylinder 250 through the stationary piston rod thereof. The movable cylinder 250 thus is forced forwardly to close the die head 142 to its threading diameter. The details of one means of accomplishing this is shown and described in the co-pending application of Harry L. Berkey, Serial No. 597,424, filed June 4, 1945, for Machine Tool. At the same time, fluid is being forced from the rear end of cylinder 250 through line 252 and valve V30 into exhaust line 254 whence it is returned to the reservoir.

Closing of contacts C6E closes a circuit L1—C6E—S31A—L2, energizing solenoid S31A and setting valve V31 to pass fluid from supply line 182 into line 256 and the forward end of the right hand die head operating cylinder 258 where the pressure it utilized as described above to close the die head 156 of the right hand threading unit 136 to thread-cutting position. Fluid is simultaneously forced from the rear end of cylinder 258 through line 260 and valve V31 into the exhaust line 262 by which it is carried back to the reservoir. The closing of both thread-cutting heads closes limit switches LS10 and LS11.

The index mechanism, at the completion of its forward movement, actuates limit switch LS4B to open its contacts LS4B and close contacts LS4A. Opening of contacts LS4B opens the circuit L1—LS4B—C6B—LS2—LS3—C7A—R6—L2, de-energizing relay R6 and opening all of its five contacts. Contacts C6B, being in the last-named circuit have no effect on the cycle. Opening of contacts C6A opens the circuit L1—C6A—S29B—L2, de-energizing solenoid S29B. Valve V29, however, does not alter its previous position so that pressure is maintained in the rearward end of index cylinder 118. Opening of contacts C6C opens the circuit L1—C6C—R16—L2 but relay R16 remains energized by the above-mentioned second circuit through contacts C16C. Opening of contacts C6D opens the circuit L1—C6D—S30A—L2, de-energizing solenoid S30A, which has no effect on valve V30. Opening of contacts C6E opens the circuit L1—C6E—S31A—L2 to de-energize solenoid S31A also with no effect on the associated valve.

The closing of contacts LS4A closes a circuit L1—LS4A—LS5B—LS6B—R8—L2. Limit switches LS5 and LS6 are closed on contacts LS5B and LS6B respectively when the chucks 146 and 158 for gripping the pipe are open, which they are at this period in the cycle. The last-named circuit energizes relay R8, opening the normally closed contacts C8D and closing the remaining four normally open contacts associated with said relay. The opening of contacts C8D has no effect on the cycle at this time, since this is the first cycle of operation of the machine. In subsequent automatically repeating cycles, however, the opening of contacts C8D de-energises R14. This is necesary in order to open the circuits L1—C14A—S28B—L2 and L1—C14B—S25B—L2 to de-energize S28B and S25B during the automatically repeating cycle. The closing of contacts C8C closes a circuit L1—PB19—PB17—C25B—C13B—C8C—R8—L2 to provide a second circuit for the energization of relay R8. The closing of contacts C8A closes a circuit L1—C19A—C8A—S28A—L2, energizing solenoid S28A. The closing of contacts C8B closes a circuit L1—C18A—C8B—S25A—L2, energizing solenoid S25A. Solenoids S28A and S25A operate to reverse the positions of valves V28 and V25. Fluid is therefore pumped through line 170, sequence valve 176, and regulating valve 184 to the valve V28 which is now set to deliver the fluid through line 264 to the lower end of gripper cylinder 192 to force rack 196 upwardly and close the grips. Fluid is expelled from the upper end of cylinder 192 through line 188 and valve V28 to exhaust line 254. Pump 166 forces fluid through line 174, sequence valve 178 and regulating valve 186 to the valve V25, which is now set to deliver the fluid through line 266 to the lower end of gripper cylinder 194 to force rack 198 upward and close the grips. Fluid is expelled from the upper end of cylinder 194 through line 190 and valve V25 to the exhaust line 254.

Since the large volume demand for the fluid to close the grips causes the pressure in lines 170 and 174 to drop below that in the secondary pressure lines 204 and 206, fluid passes from lines 204 and 206 through check valves 272 and 274 respectively into lines 170 and 174 to maintain at least the secondary pressure. When the cylinders are filled the pressure again rises, check valves 272 and 274 close, and the pressure in the gripping cylinders is that set by regulating valves 184 and 186.

Closing of contacts C8E closes a circuit L1—LS4A—C27B—C8E—C9C—R10—L2, energizing relay R10 and closing the two sets of contacts associated therewith. The closing of contacts C10A has no immediate effect on the circuit, while the closing of contacts C10B closes a circuit L1—LS13A—LS8A—C10B—R10—L2 to provide a second circuit for the energization of relay R10. This circuit includes contacts LS13A and LS8A of limit switches LS13 and LS8 respectively, which contacts are closed when the carriages of both threading machines are in their rearmost positions. Closing of contacts C8E also closes a circuit L1—LS4A—C27B—C8E—C21C—R22—L2 to energize relay R22 and close the two sets of contacts associated therewith, neither of which have any effect on the circuit at the present time. A second circuit to energize relay R22 is, however, closed by the closing of contacts C22B, namely: L1—LS4A—C27B—C8E—C9C—C10B—C22B—R22—L2.

The above-described closing of the grips of both threading units operates the limit switches LS2, LS3, LS5 and LS6, opening switches LS2 and LS3 and contacts LS5B and LS6B and closing contacts LS5A and LS6A. The opening of contacts LS5B and LS6B opens the circuit L1—LS4A—LS5B—LS6B—R8—L2 but relay R8 remains energized by the above-described second circuit through contacts C8C. The opening of limit switches LS2 and LS3 has no immediate effect.

Closing of contacts LS5A closes a circuit L1—LS13A—LS8A—LS9B—LS5A—C10A—R9—L2 to energize relay R9, opening contacts C9C and closing contacts C9A and C9B. Opening of contacts C9C opens the circuit L1—LS4A—C27B—C8E—C9C—C10B—C22B—R22—L2. However, relay R22 remains energized by the circuit through C21C. The opening of contacts C9C also opens the circuit L1—LS4A—C27B—C8E—C9C—R10—L2 leaving relay 910 energized only by the circuit L1—LS13A—LS8A—C10B—R10—L2. The closing of contacts C9B closes a circuit L1—C9B—LS9B—LS5A—C10A—R9—L2 to provide a second circuit for energizing relay R9. Contacts C9B also close a circuit L1—C9B—C10B—R10—L2 and a circuit L1—C9B—C22B—R22—L2 to provide holding circuits for relays R10 and R22 respectively. The same contacts C9B also close a circuit L1—C9B—LS14B—LS6A—C22A—R21—L2, energizing relay R21, opening contacts C21C and closing contacts C21A and C21B closes of contacts C9A closes a circuit L1—C9A—S26A—L2, energizing solenoid S26A. Solenoid S26A shifts the piston of valve V26 to permit fluid under pressure to flow from supply line 180 through valve V26 and Line 232 to the rear end of the left hand carriage operating cylinder 234. Due to this pressure in the rear end of cylinder 234, the left hand carriage 138 begins to advance toward the work to be threaded while the front end of cylinder 234 exhausts through line 230, valve V26 and line 254 to the reservoir.

Opening of contacts C21C opens the circuit 1—LS4A—C27B—C8E—C21C—R22—L2 but relay R22 remains energized by the above-named holding circuit through C22B. The closing of contacts C21B closes a circuit L1—C21B—LS14B—LS6A—C22A—R21—L2 to provide a second circuit for the energization of relay R21. Closing of contacts C21A closes a circuit L1—C21A—S23A—L2, energizing solenoid S23A. Solenoid S23A shifts the piston of valve V23 to permit fluid to pass from supply line 182 through valve V23 and line 244 to the rear end of right hand carriage operating cylinder 246 by reason of which carriage 154 begins to advance toward the pipe to be threaded. At the same time, cylinder 246 exhausts through line 242, valve V23 and exhaust line 262 into the reservoir.

The advance of carriage 138 causes a dog 268, which is in contact with limit switch LS8 when the carriage 138 is in its rearmost position, to release said limit switch, opening contacts LS8A and closing contacts LS8B. The advance of carriage 154 causes a dog 270 which is in contact with the limit switch LS13 when the carriage 154 is at its rearmost position, to release said limit switch, opening contacts LS13A and closing contacts LS13B. The opening of these contacts LS8A and LS13A opens the circuit L1—LS13A—LS8A—C10B—R10—L2, leaving relay R10 energized by the circuit L1—C9B—C10B—R10—L2. Opening of contacts LS8A and LS13A also opens the circuit L1—LS13A—LS8A—LS9B—LS5A—C10A—R9—L2, leaving relay R9 energized by the circuit L1—C9B—LS9B—LS5A—C10A—R9—L2.

The continued advance of the two carriages causes the dogs 269 and 271 to actuate the limit switches LS9 and LS14 respectively, opening contacts LS9B and LS14B and closing contacts LS9A and LS14A. The opening of contacts LS14B opens the circuit L1—C9B—LS14B—LS6A—C22A—R21—L2 and L1—C21B—LS14B—LS6A—C22A—R21—L2, thus de-energizing relay R21 and opening contacts C21A and C21B and closing contacts C21C. The opening of contacts C21A opens the circuit L1—C21A—S23A—L2 to de-energize solenoid S23A.

Since contacts C21B are in the already open circuit L1—C21B—LS14B—LS6A—C22A—R21—L2, their opening at this time has no effect on the cycle. Closing of contacts C21C closes the circuit L1—LS4A—C27B—C8E—C21C—R22—L2 to provide another circuit for energizing relay R22. The opening of contacts LS9B opens the circuit L1—C9B—LS9B—LS5A—C10A—R9—L2, de-energizing relay R9, opening contacts C9A and C9B and closing contacts C9C. The opening of contacts C9A opens the circuit L1—C9A—S26A—L2, de-energizing solenoid S26A.

The de-energization of solenoids S23A and S26A causes the pistons of valves V23 and V26 to be freed to the action of the centering devices contained in these valves, which results in the closing of the valves and the cutting off of the lines 230, 232, 242 and 244 to the respective carriage operating cylinders 234 and 246.

Carriage 138 therefore stops but its momentum results in the development of a momentary high-pressure condition in the forward end of cylinder 234. This pressure is transmitted through line 230 which is blocked by valve V26. Fluid is therefore forced from regulating valve 276, installed in line 230, through line 278 and check valve 280 into line 226. When the pressure in cylinder 234 drops to a value equal to that maintained in line 226, check valve 280 closes and the momentum of carriage 138 has been controlled. The stopping of carriage 154 is similarly cushioned by allowing the high pressure to be dissipated from regulating valve 282, installed in line 242, through line 284 and check valve 286 into line 236.

The opening of contacts C9B opens the circuit L1—C9B—C10B—R10—L2, de-energizing relay R10 and opening the two sets of contacts associated therewith. However, the relay R10 is energized again and its contacts closed by the closing of contacts C9C which close a circuit L1—LS4A—C27B—C8E—C9C—R10—L2. Opening of contacts C9B also opens the circuit L1—C9B—C22B—R22—L2 but relay R22 remains energized by the circuit through L1—LS4A—C27B—C8E—C21C—R22—L2.

The closing of limit switch contacts LS9A closes a circuit L1 — LS8B — LS10 — LS9A — SW3A — R11—L2, energizing relay R11, closing contacts C11A and C11B and opening contacts C11C and C11D. The opening of contacts C11C and C11D has no effect on the cycle at this time. The closing of contacts C11B closes a circuit L1—LS8B—LS10—C11B—SW3A—R11—L2 to provide a holding circuit for relay R11. Closing of contacts C11A closes a circuit L1—C11A—S27B—L2 to energize the solenoid S27B.

The closing of limit switch contacts LS14A closes a circuit L1—LS13B—LS11—LS14A—SW4A—R23—L2, energizing relay R23, closing contacts C23A and C23B and opening contacts C23C and C23D. The opening of contacts C23C and C23D has no effect on the cycle at this time. The closing of contacts C23B closes a circuit L1—LS13B—LS11—C23B—SW4A—R23—L2 to provide a holding circuit for relay R23. Closing of contacts C23A closes a circuit L1—C23A—S24B—L2 to energize the solenoid S24B.

The energization of solenoid S27B reverses the position of the piston of valve V27 to permit hydraulic fluid to pass from supply line 180 through valve V27 and line 288 to the upper end of leadscrew nut operating cylinder 228 thus forcing leadscrew nut 229 to engage the leadscrew 290. Fluid is expelled from the lower end of cylinder 228 through line 226 and valve V27 into exhaust line 254. The energization of solenoid S24B reverses the position of the piston of valve V24 to permit hydraulic fluid to pass from supply line 182 through valve V24 and line 292 to the upper end of leadscrew nut operating cylinder 238 thus forcing leadscrew nut 240 to engage the leadscrew 294. Fluid is expelled from the lower end of cylinder 238 through line 236 and valve V24 into exhaust line 262. The engagement of both leadscrew nuts with their respective leadscrews causes tthe carriage 138 and 154 to advance at a rate proportional to the speed of rotation of the die heads which at this time will begin to cut threads of the desired characteristics on the opposite ends of different work pieces as explained above.

The movement of leadscrew nuts 229 and 240 actuates the limit switches LS7 and LS12, opening contacts LS7A and LS12A and closing LS7B and LS12B. The opening of contacts LS7A and LS12A has no immediate effect on the cycle. Closing of contacts LS7B and LS12B closes a circuit L1—LS7B—LS12B—C16D—R15—L2 to energize relay R15 and close its single set of contacts C15A. The closing of contacts C15A closes a circuit L1—C15A—S29A—L2, energizing solenoid S29A. The energization of solenoid S29A shifts the piston of valve V29 to permit fluid to pass from supply line 212 through valve V29 and line 216 to the forward end of index operating cylinder 118 to force the withdrawal of the indexing member 120. Fluid is expelled from the rearward end of cylinder 118 through line 214 and valve V29 into exhaust line 254 while the indexing member 120 returns to its original position preparatory to reengaging the chain 116 for another forward indexing stroke.

At the beginning of its return stroke, the index mechanism actuates the limit switch LS4 to open its contacts LS4A and close contacts LS4B. Opening of contacts LS4A opens the circuit L1—LS4A—C27B—C8E—C21C—R22—L2, de-energizing relay R22 and opening its two sets of contacts. Opening of contacts LS4A also opens the circuit L1—LS4A—C27B—C8E—C9C—R10—L2 to de-energize relay R10 and open its two sets of contacts. Opening of these four sets of contacts has no effect on the cycle at the present time.

At the end of its return stroke, the index mechanism actuates the limit switch LS1 to open contacts LS1B and close contacts LS1A. The opening of contacts LS1B opens a circuit L1—LS1B—C16C—R16—L2 to de-energize relay R16 and open the four sets of contacts associated therewith. The opening of contacts C16C, being in the last-named circuit, has no further effect on the cycle. The opening of contacts C16A opens the circuit L1—C16A—S39—L2 to de-energize solenoid S39. The opening of contacts C16B opens the circuit L1—C16B—S40—L2 to de-energize solenoid S40. Therefore valve V39 is opened automatically to permit hydraulic fluid to pass from line 180 through valve V39 and line 222 to valve 200. Valve V40 is also opened to permit fluid to pass from line 182 through valve V40 and line 224 to valve 202. Since the leadscrew nuts have been closed, there is no demand in the hydraulic system for a large volume of oil and the pressure in lines 180 and 182 rises. This pressure wave is transmitted from line 180 through valve V39 and line 222 to shift the piston of valve 200, shutting off the low pressure line 204 from pump 162. Both supply lines 170 and 180 are then supplied from the high pressure side of the pump, the sequence valve 176 permitting fluid to move from line 170 into line 180 to maintain the high pressure.

The high pressure wave on the right hand side of the system is transmitted from line 182 through valve V40 and line 224 to shift the piston of valve 202, shutting off the low-pressure line 206 from pump 166. Both supply lines 174 and 182 are then supplied from the high pressure side of the pump, the sequence valve 178 permitting fluid to move from line 174 into line 182 to maintain the high pressure. At this period in the cycle, the low pressure lines 168 and 172 from pumps 162 and 166 respectively are connected by valves 200 and 202 to exhaust lines 296 and 298.

Since check valves 218, 220, 272, and 274 prevent fluid from reaching lines 204 and 206, these lines are without pressure. The index mechanism is now retracted and fluid is contained in the system comprising cylinder 118, lines 214 and 216, valve V29 and line 212 at zero pressure by means of the check valves 208 and 210.

As carriage 138 advances, pressure is built up in the forward end of cylinder 234. The hydraulic system comprises means for regulating this pressure and using it as a cushioning means and for eliminating backlash between leadscrew and nut. This is done by setting the regulating valve 276 to a pressure against which the leadscrew can efficiently operate. When the pressure in line 230 exceeds this value, fluid escapes from valve 276 into line 278 and so through check valve 280 into line 226 which is now at zero pressure. The pressure in the forward end of cylinder 246 is similarly controlled by regulating valve 282.

Opening of contacts C16D opens the circuit L1—LS7B—LS12B—C16D—R15—L2 to de-energize relay R15 and opening contacts C15A. The opening of contacts C15A opens the circuit L1—C15A—S29A—L2 to de-energize solenoid S29A. As the carriages move forward under the influence of their respective leadscrews, limit switches LS9 and LS14 are released, opening contacts LS9A and LS14A and closing contacts LS9B and LS14B. This opens the circuits L1—LS8B—LS10—LS9A—SW3—R11—L2 and L1—LS13B—LS11—LS14A—SW4—R23—L2 but relays R11 and R23 remain energized through their respective holding circuits described above.

When the carriages have carried their respective die heads forward far enough to have completed the threading operation, dogs 273 and 275 close limit switches LS19 and LS20. Closing of limit switch LS19 closes a circuit L1—LS19—R12—L2 to energize relay R12 and close the five sets of contacts associated therewith. Closing of contacts C12A closes a circuit L1—C12A—R16—L2 to energize relay R16 and close the four sets of contacts associated therewith. Closing of contacts C16A closes a circuit L1—C16A—S39—L2 to energize solenoid S39. Closing of contacts C16B closes a circuit L1—C16B—S40—L2 to energize solenoid S40. This energization of solenoids S39 and S40 restores the original condition in the hydraulic system preparatory to large volume demand on the system for the rapid withdrawal of the carriages from the work.

The closing of contacts C16C has no immediate effect on the cycle. The closing of contacts C16D closes a circuit L1—LS7B—LS12B—C16D—R15—L2 energizing relay R15 and closing contacts C15A. Closing of contacts C15A closes a circuit L1—C15A—S29A—L2 to energize solenoid S29A. This does not alter the position of the valve V29 nor have any effect on the system.

The above described closing of contacts C12B closes a circuit L1—C12B—S30B—L2 to energize solenoid S30B. Closing of contacts C12C and C12E has no immediate effect on the cycle. Closing of contacts C12D closes a circuit L1—LS8B—C12D—R12—L2 to provide a holding circuit for relay R12. Closing of limit switch LS20 closes a circuit L1—LS20—R24—L2, energizing relay R24 and closing the five sets of contacts associated therewith. Closing of contacts C24A closes a circuit L1—C24A—R16—L2 to provide a holding circuit for relay R16. Closing of contacts C24B closes a circuit L1—C24B—S31B—L2 to energize solenoid S31B.

Energization of solenoid S30B shifts the piston of valve V30 to permit hydraulic fluid to pass from supply line 180 through valve V30 and line 252 into the rearward end of the die head operating cylinder 250 and thus cause the chasers of die head 142 to be withdrawn radially from the thread cut so that the die head 142 may be withdrawn axially to clear the work. Fluid is expelled from the forward end of cylinder 250 through line 248 and valve V30 to the exhaust line 254.

Energization of solenoid S31B shifts the piston of valve V31 to permit hydraulic fluid to pass from supply line 182 through valve V31 and line 260 into the rearward end of the right hand die head operating cylinder 258 and thus cause the chasers of die head 156 to be withdrawn radially from the thread cut so that the die head 156 may be withdrawn axially to clear the work. Fluid is expelled from the forward end of cylinder 258 through line 256 and valve V31 to the exhaust line 262.

Closing of contacts C24C and C24E has no immediate effect on the cycle. Closing of contacts C24D closes a circuit L1—LS13B—C24D—R24—L2. The above described opening of both die heads causes the opening of limit switches LS10 and LS11. Opening of switch LS10 opens the circuits L1—LS8B—LS10—LS9A—SW3—R11—L2 and L1—LS8B—LS10—C11B—SW3—R11—L2 which de-energizes relay R11. The opening of switch LS11 opens the circuits L1—LS13B—LS11—LS14A—SW4—R23—LS2 and L1—LS13B—LS11—C23B—SW4—R23—L2 which de-energizes relay R23. The de-energization of relay R11 opens contacts C11A and C11B and closes contacts C11C and C11D. The opening of contacts C11B and C11C has no immediate effect on the cycle. The opening of contacts C11A opens the circuit L1—C11A—S27B—L2 to de-energize solenoid S27B. The closing of contacts C11D closes a circuit L1—C11D—C12E—S27A—L2 to energize solenoid S27A.

The de-energization of relay R23 opens the contacts C23A and C23B and closes contacts C23C and C23D. The opening of contacts C23B has no immediate effect on the cycle. The opening of contacts C23A opens the circuit L1—C23A—S24A—L2 to de-energize solenoid S24B. The closing of contacts C23C closes a circuit L1—C23C—C11C—C16C—R16—L2, providing a holding circuit for relay R16. The closing of contacts C23D closes a circuit L1—C23D—C24E—S24A—L2 to energize solenoid S24A.

Energization of solenoid S27A by the de-energization of R11 shifts the piston of valve V27 to permit fluid to pass from supply line 180 through valve V27 and line 226 into the lower end of cylinder 228 to force the piston thereof upwardly and thus disengage leadscrew nut 229 from leadscrew 290. Fluid is expelled from the upper end of cylinder 228 through line 288 and valve V27 into exhaust line 254. Energization of solenoid S24A shifts the piston of valve V24 to permit fluid to pass from supply line 182 through valve V24 and line 236 into the lower end of cylinder 238 to force the piston thereof upwardly and thus disengage leadscrew nut 240 from leadscrew 294. Fluid is expelled from the upper end of cylinder 238 through line 292 and valve V24 into exhaust line 262. With the leadscrew nuts disengaged, both carriages are brought to a full stop.

The opening of the leadscrew nuts actuates limit switches LS7 and LS12, opening contacts LS7B and LS12B and closing contacts LS7A and LS12A. The opening of contacts LS7B and LS12B opens the circuit L1—LS7B—LS12B—C16D—R15—L2, de-energizing relay R15 and opening contacts C15A. Opening of contacts C15A opens the circuit L1—C15A—S29A—L2 to de-energize solenoid S29A which has no immediate effect. The closing of contacts LS7A closes a circuit L1—LS8B—LS7A—C12C—R13—L2, energizing relay R13, opening contacts C13B and C13C and closing contacts C13A and C13D.

The opening of contacts C13C has no immediate effect. The opening of contacts C13B opens the circuit L1—PB18—PB17—C25B—C13B—C8C—R8—L2, de-energizing relay R8 and opening contacts C8A, C8B, C8C, and C8E and closing contacts C8D. The operation of the latter three sets of contacts have no immediate effect. The opening of contacts C8A opens a circuit L1—C19A—C8A—S28A—L2 to de-energize solenoid S28A. The opening of contacts C8B opens a circuit L1—C18A—C8B—S25A—L2 to de-energize solenoid S25A. The closing of contacts C13D closes a circuit L1—C13D—R17—L2, energizing relay R17 and closing the two sets of contacts thereof. The closing of contacts C17A closes a holding circuit for the relay, namely L1—C17A—R17—L2 while the closing of contacts C17B has no immediate effect.

The closing of contacts C13A closes a circuit L1—C13A—S26B—L2 to energize solenoid S26B. The closing of limit switch contacts LS12A closes a circuit L1—LS13B—LS12A—C24C—R25—L2, energizing relay R25, opening contacts C25B and C25C and closing contacts C25A and C25D. The operation of contacts C25B and C25C has no immediate effect while the closing of contacts C25D closes a circuit L1—C25D—R17—L2 to provide a third circuit for the energization of relay R17. The closing of contacts C25A closes a circuit L1—C25A—S23B—L2 to energize solenoid S23B.

Energization of solenoid S26B shifts the piston of valve V26 to allow hydraulic fluid to flow from line 180 through valve V26 and line 230 into the forward end of cylinder 234 to start the left hand carriage 138 moving rearwardly. Energization of solenoid S23B shifts the piston of valve V23 to allow fluid to flow from line 182 through valve V23 and line 242 into the forward end of cylinder 246 to start the right hand carriage 154 moving rearwardly. Fluid is expelled from the rearward ends of cylinders 234 and 246 through lines 232 and 244 respectively and valves V26 and V23 into exhaust lines 254 and 262.

As carriages 138 and 154 start to move rearwardly, dogs 273 and 275 release limit switches LS19 and LS20 and allow them to open. This opens the circuits L1—LS19—R12—L2 and L1—LS20—R24—L2 with no immediate effect. Carriages 138 and 154 continue rearwardly until they reach their rearmost or "loading" position. Here, the limit switches LS8 and LS13 are again actuated to open contacts LS8B and LS13B and close contacts LS8A and LS13A. Opening of contacts LS8B opens the circuit L1—LS8B—C12D—R12—L2 to de-energize relay R12 and open the five sets of contacts associated therewith. The opening of contacts C12A opens the circuit L1—C12A—R16—L2. Opening of contacts C12B opens the circuit L1—C12B—S30B—L2 to de-energize solenoid S30B. The opening of contacts C12C opens the circuit L1—LS8B—LS7A—C12C—R13—L2, de-energizing relay R13, opening contacts C13A and C13D and closing contacts C13B and C13C. The closing of contacts C13B and C13C has no immediate effect. The opening of contacts C13D opens the circuit L1—C13D—R17—L2. The opening of contacts C13A opens the circuit L1—C13A—S26B—L2 to de-energize solenoid S26B. The opening of contacts C12D has no immediate effect. The opening of contacts C12E opens the circuit L1—C11D—C12E—S27A—L2 to de-energize solenoid S27A.

Opening of contacts LS13B opens the circuit L1—LS13B—C24D—R24—L2, de-energizing relay R24 and opening the five sets of contacts associated therewith. The opening of contacts C24A opens a circuit L1—C24A—R16—L2. The opening of contacts C24B opens a circuit L1—C24B—S31B—L2 to de-energize solenoid S31B. The opening of contacts C24C opens a circuit L1—LS13B—LS12A—C24C—R25—L2, de-energizing relay R25, opening contacts C25A and C25D and closing contacts C25B and C25C. The opening of contacts C25A opens a circuit L1—C25A—S23B—L2 to de-energize solenoid S23B. Closure of contacts C25B and C25C has no immediate effect. Opening of contacts C25D opens the circuit L1—C25D—R17—L2. The opening of contacts C24D has no immediate effect. The opening of contacts C24E opens the circuit L1—C23D—C24E—S24A—L2 to de-energize solenoid S24A.

Of the solenoids thus de-energized by the return of carriages 138 and 154 to loading position, only S26B and S23B affect the cycle immediately. The de-energization of solenoid S26B permits the piston of valve V26 to occupy a neutral position and close all ports of the valve. Fluid is therefore trapped in cylinder 234 and lines 230 and 232 and carriage 138 stops. The momentum of carriage 138 causes a momentary increase in pressure in the rear end of cylinder 234 which is dissipated through line 232 and regulating valve 304 into exhaust line 254, thus providing a cushion to absorb the shock of the abrupt stopping of the carriage. In a similar manner, de-energization of solenoid S23B, permits the piston of valve V23 to occupy a neutral position, closing all ports to the valve and stopping carriage 154. The momentum of carriage 154 is cushioned against the fluid trapped in the rear end of cylinder 246 and the rise in pressure is dissipated through line 244 and regulating valve 306 into exhaust line 262.

The closing of limit switch contacts LS8A and LS13A also closes a circuit L1—LS13A—LS8A—C17B—C8D—C13C—C25C—R14—L2 to energize relay R14 and close the two sets of contacts associated therewith. The closing of contacts C14A closes a circuit L1—C14A—S28B—L2, energizing solenoid S28B. The closing of contacts C14B closes a circuit L1—C14B—S25B—L2, energizing solenoid S25B. Energization of solenoid S28B shifts the piston of valve V28 to allow fluid to pass from line 178 through valve V28 and line 188 to the upper end of cylinder 192 whereby rack 196 is forced downwardly and the grips of the left hand threading unit are opened to release the finished work. Energization of solenoid S25B shifts the piston of valve V25 to allow fluid to pass from line 174 through valve V25 and line 190 to the upper end of cylinder 194 whereby rack 198 is forced downwardly and the grips of the right hand threading unit are opened. Fluid is expelled from the lower ends of cylinders 192 and 194 through lines 264 and 266 respectively and through valves V28 and V25 into exhaust line 254.

The opening of the grips on both threading units actuates the limit switches LS5 and LS6 to open contacts LS5A and LS6A and close contacts LS5B and LS6B. Limit switches LS2 and LS3 are also closed by this action and the closing of these last two serve the same purpose as pressing the cycle start button did at the beginning of the operation, that of energizing relay R6 which now occurs through the circuit L1—LS1A—LS2—LS3—C7A—R6—L2. The system proceeds from this point, as described above, to perform another automatic cycle of operation.

*To operate chucks independently*

To operate either chuck independently of the remainder of the machine, in order to test the gripping pressure, for example, or for any other reason, it is necessary to set switch SW1 (Fig. 2C) on contact B. This closes a circuit L1—SW2A—SW1B—R18—L2 to energize relay R18, open contacts C18A and close contacts C18B. Since the contacts C18A are in the circuit of solenoid S25A, the opening of said contacts prevents the energization of said solenoid and therefore prevents the closing of the chuck 153 on the right hand threading unit 136. Button PB6 is then pressed to close a circuit L1—SW2A—SW1B—PB6—C7C—R27—L2, energizing relay R27, closing contacts C27A and opening contacts C27B. The closing of contacts C27A closes a circuit L1—SW2A—SW1B—PB6—C7C—C27A—R8—L2 to energize relay R8. Opening of contacts C27B has no effect.

The energization of relay R8 closes contacts C8A, C8B, C8C and C8E and opens contacts C8D. Closing of contacts C8A closes a circuit L1—C19A—C8A—S28A—L2 to energize solenoid S28A which causes the closing of the chuck 146 of the left hand threading unit in the same manner as described above. The closing of contact C8C closes a circuit L1—PB18—PB17—C25B—C13B—C8C—R8—L2, for holding relay R8 energized after pressure on push button PB6 is released. The remaining contacts of relay R8 have no effect.

To open the chuck 146, push button switch PB17 is pressed to open the circuit L1—PB18—PB17—C25B—C13B—C8C—R8—L2. Thus relay R8 is de-energized, contacts C8A, C8B, C8C and C8E are opened and contacts S8D are closed. The opening of contacts C8A opens the circuit L1—

C19A—C8A—S28A—L2 to de-energize solenoid S28A. The opening of contacts C8B, C8C and C8E has no effect. The closing of contacts C8D closes a circuit L1—SW2A—SW1B—PB17—C8D—C13C—C25C—R14—L2, energizing relay R14 and closing C14A and C14B. Closing of contacts C14A closes a circuit L1—C14A—S28B—L2, energizing solenoid S28B and thereby causing the opening of the grips in the manner described above in the description of the complete cycle.

The right hand chuck 159 may be operated separately in exactly the same manner as above but by using SW2 instead of SW1, R19 for R18, solenoid S28A for S25A, push button PB7 for PB6, PB17 for PB18 PB18 for PB17, solenoids S25A and 25B for S28A and S28B, etc.

*Separate carriage operation*

Figure 2A:
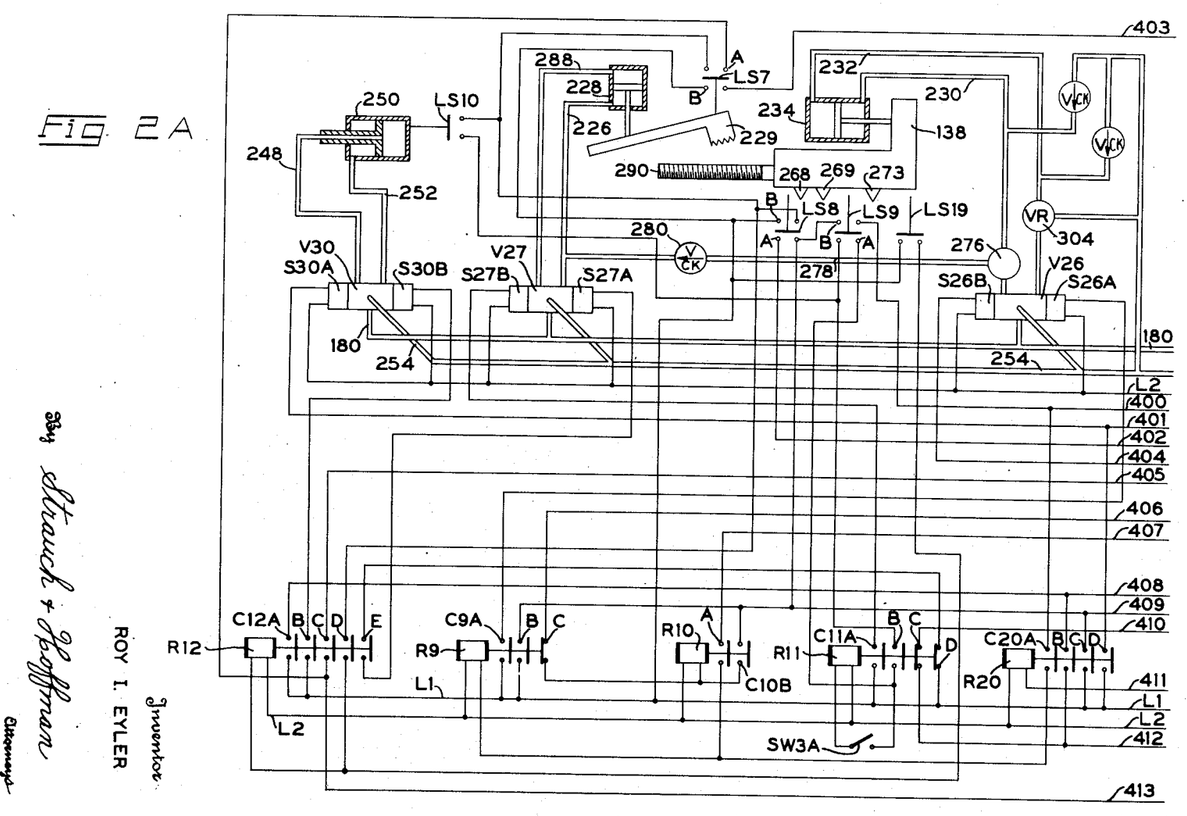
Figure 2B:
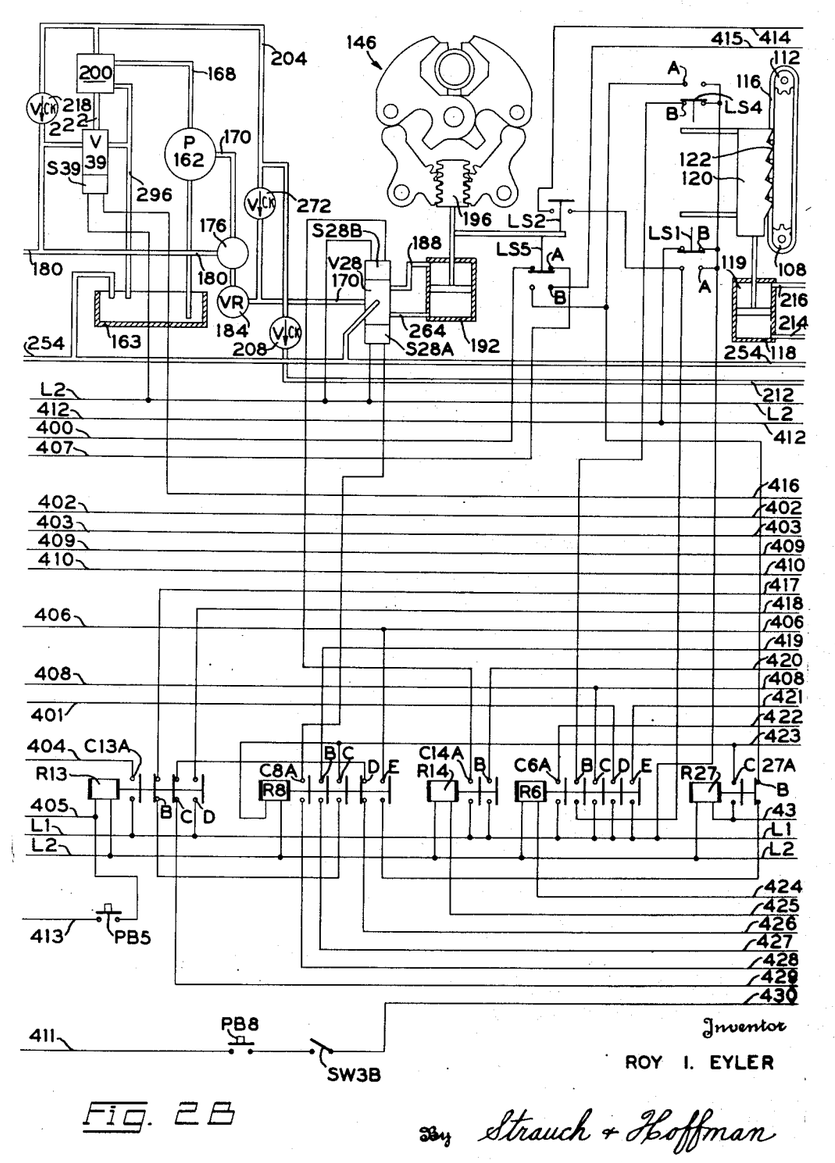
Figure 2C:
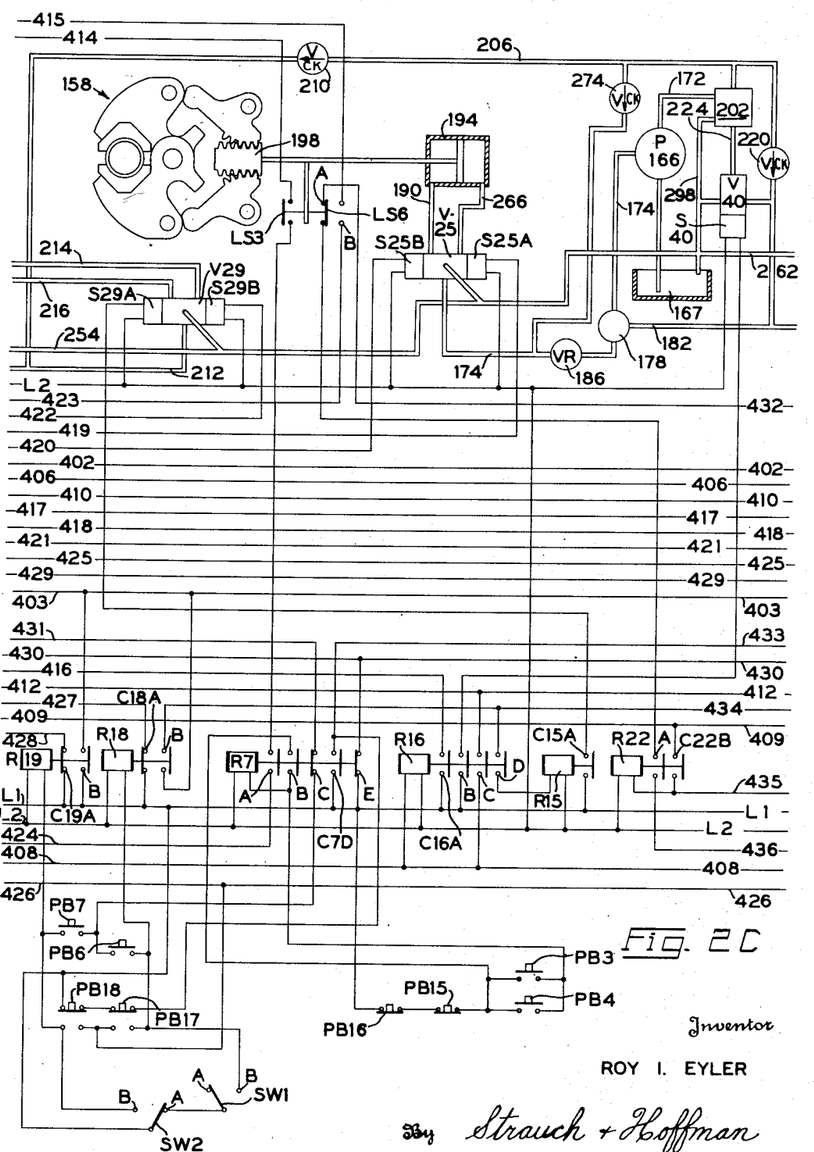

The circuit provides for the separate operation of either carriage 138 or 154. Such operation is useful in setting up the machine for a particular size of work piece and especially for locating the dogs on the carriage so that the proper length of thread is generated. To initiate the movement of carriage 138, for example, it is necessary to open switch SW3A (Fig. 2A) and close SW3B (Fig. 2B). Push button switch PB8 is then pressed to close a circuit L1—C7E—SW3B—PB8—R20—L2, energizing relay R20 and closing the four sets of contacts associated therewith. The closing of contacts C20A has no effect. The closing of contacts C20B closes a circuit L1—C23C—C11C—C20B—R16—L2, to energize relay R16 and close the four sets of contacts associated therewith. The closing of contacts C16A and C16B closes respectively the circuits L1—C16A—S39—L2 and L1—C16B—S40—L2 to energize solenoids S39 and S40 with the results already described in the operation of the entire machine.

The closing of contacts C16C closes a circuit L1—C23C—C11C—C16C—R16—L2 to provide a holding circuit for relay R16 after button PB8 is released. The closing of contacts C16D has no effect. The closing of contacts C20C closes a circuit L1—C20C—LS9B—C20A—R9—L2, energizing relay R9. Closing of contacts C20D closes a circuit L1—C20D—S30A—L2 to energize solenoid S30A, which results in the closing to threading position of the die head 142 as described above. The energization of relay R9 closes contacts C9A and C9B and opens contacts C9C. The closing of contacts C9A closes a circuit L1—C9A—S26A—L2 to energize solenoid S26A which, as in the above description of the main cycle of operation, causes the left hand carriage 138 to begin advancing toward the end of the work. The closing of contacts C9B closes a circuit L1—C9B—LS9B—C20A—R9—L2 to provide a second circuit for the energization of relay R9. The opening of contacts C9C has on effect.

The closing of die head 142 closes the limit switch LS10. The start of the advance movement of carriage 138 releases limit switch LS9, opening contacts LS9A and closing contacts LS9B. When the carriage 138 has arrived at the point at which it is desired to stop the forward movement of said carriage, button PB8 is released, opening the circuit L1—C7E—SW3—PB8—R20—L2. This de-energizes relay R20 and opens contacts C20A which, in turn, opens the circuits L1—C20C—LS9B—C20A—R9—L2 and L1—C9B—LS9B—C20A—L2. Thus relay R9 is de-energized, opening contacts C9A which opens the circuit L1—C9A—S26A—L2 and de-energizes solenoid S26A, which, as described above, stops the carriage 138.

To return the carriage to its original loading position, the procedure is simply reversed by pressing push button switch PB5. This closes a circuit L1—LS8B—LS7A—PB5—R13—L2 to energize relay R13 and close contacts C13A. Closing of contacts C13A closes a circuit L1—C13A—S26B—L2, energizing solenoid S26B and thereby starting carriage 138 rearwardly. The carriage stops as before, when valve V26 is freed by the deenergization of solenoid S26B which, in this case, takes place when button PB5 is released.

If the button PB8 for starting the forward movement of the carriage, is held a sufficient length of time, limit switch LS9 will be actuated to stop the carriage automatically at the "start of thread" position, as follows. The actuation of limit switch LS9 results in the opening of contacts LS9B and the closing of contacts LS9A. Opening of contacts LS9B opens circuit L1—C20C—LS9B—C20A—R9—L2 and L1—C9B—LS9B—C20A—R9—L2 thereby de-energizing relay R9 with the same results as are obtained if button PB8 is released as described above. This operation leaves the carriage in position either to start the threading operation and thus continue the cycle or to be returned to loading position as also explained above.

It was seen above that release of button PB8 results in the de-energization of relay R20 and the opening of contacts C20A. Contacts C20B also open, opening the circuit L1—C23C—C11C—C20B—R16—L2. Contacts C20C open with no effect. Contacts C20D open, opening the circuit L1—C20D—S30A—L2 and de-energizing solenoid S30A. The de-energization of relay R9 described above also opens contacts C9B with no effect and closes contacts C9C.

Now, to continue the operating cycle it is necessary to return switches SW3A and SW3B to their original positions, that is, to close SW3A and open SW3B. This closes a circuit L1—LS8B—LS10—LS9A—SW3A—R11—L2, to energize relay R11, closing contacts C11A and C11B and opening contacts C11C and C11D. Opening of contacts C11D has no effect. Closing of contacts C11A closes a circuit L1—C11A—S27B—L2 to energize solenoid S27B which, as described above, causes the left hand leadscrew nut 229 to engage leadscrew 290. Thus the carriage begins to advance under leadscrew feed and a thread is generated on the work piece if one is in place in the chuck 146.

The closing of contacts C11B closes a circuit L1—LS8B—LS10—C11B—SW3A—R11—L2 to provide a holding circuit for relay R11. The opening of contacts C11C opens the circuit L1—C23C—C11C—C16C—R16—L2, de-energizing relay R16 and opening the four sets of contacts associated therewith. The opening of contacts C16C and C16D have no effect. The opening of contacts C16A and C16B opens the circuits L1—C16A—S39—L2 and L1—C16B—S40—L2 respectively and de-energizes the solenoids S39 and S40 with the same results as described in the automatic cycle description above.

The closure of the leadscrew nut actuates limit switch LS7 to open contacts LS7A and close contacts LS7B. As the carriage 138 begins to move forward under leadscrew feed, limit switch LS9 is again released, opening contacts LS9A and closing contacts LS9B. The opening of contacts LS9A opens the circuit L1—LS8B—LS10—LS9A—SW3A—R11—L2. When the carriage has advanced far enough to cut the desired length of thread, the dog 273 closes limit switch LS19. This closes a circuit L1—LS19—R12—L2 to energize relay R12 and close the five sets of contacts associated therewith.

The closing of contacts C12A closes the circuit L1—C12A—R16—L2, energizing relay R16 and closing its four sets of contacts. The closing of contacts C16A and C16B close the circuits L1—C16A—S39—L2 and L1—C16B—S40—L2 to energize solenoids S39 and S40 to cause the hydraulic system to supply a large volume of fluid to the various cylinders as already described. The closing of contacts C16C and C16D has no effect. The closing of contacts C12B closes the circuit L1—C12B—S30B—L2 to energize solenoid S30B and cause the die head 142 to open. The closing of contacts C12C has no effect. The closing of contacts C12D closes a holding circuit L1—LS8B—C12D—R12—L2. Closing of contacts C12E has no effect.

The opening of die head 142 opens limit switch LS10, thereby opening the circuit L1—LS9B—LS10—C11B—SW3A—R11—L2 to de-energize relay R11, open contacts C11A and C11B and close contacts C11C and C11D. The opening of contacts C11A opens the circuit L1—C11A—S27B—L2 and thereby de-energizes solenoid S27B. The opening of contacts C11B has no effect. The closing of C11C closes the holding circuit L1—C23C—C11C—C16C—R16—L2. The closing of contacts C11D closes a circuit L1—C11D—C12E—S27A—L2 to energize solenoid S27A which, as already explained, results in the disengagement of lead nut 229 from lead screw 290.

The movement of lead nut 229 actuates limit switch LS7, opening contacts LS7B and closing LS7A. The opening of contacts LS7B has no effect. The closing of contacts LS7A closes a circuit L1—LS8B—LS7A—C12C—R13—L2 to energize relay R13, thereby to close contacts C13A and C13D and open contacts C13B and C13C. The closing of contacts C13A closes a circuit L1—C13A—S26B—L2 and energizes solenoid S26B which causes the carriage to begin its return movement. The opening of contacts C13B and C13C has no effect. The closing of contacts C13D closes a circuit L1—C13D—R17—L2, energizing relay R17 and closing contacts C17A and C17B. Closure of contacts C17B has no effect but the closing of contacts C17A closes a circuit L1—C17A—R17—L2 to provide a holding circuit for relay R17.

As carriage 138 begins its return movement, limit switch LS19 is opened, opening the circuit L1—LS19—R12—L2. When carriage 138 has withdrawn to the loading position, limit switch LS8 is actuated, opening contacts LS8B and closing contacts LS8A. The opening of contacts LS8B opens the circuit L1—LS8B—C12D—R12—L2 to de-energize relay R12 and open the five sets of contacts associated therewith. The opening of contacts C12A opens the circuit L1—C12A—R16—L2. The opening of contacts C12B opens the circuit L1—C12B—S30B—L2 to de-energize solenoid S30B. The opening of contacts C12C and LS8B opens the circuit L1—LS8B—LS7A—C12C—R13—L2, de-energizing relay R13, opening contacts C13A and C13D and closing C13B and C13C. The opening of contacts C13A opens the circuit L1—C13A—S26B—L2 to de-energize solenoid S26B and thereby stop the carriage.

The opening of contacts C13D opens the circuit L1—C13D—R17—L2. The opening of contacts C12E opens are circuit L1—C11D—C12E—S27A—L2 to de-energize solenoid S27A. It will be apparent that the left hand threading unit 134 has now completed a cycle and has returned to its original condition without, however, being able to repeat the cycle. It will be evident to those skilled in the art that a similar operation may be carried out with the right hand threading unt 136, starting with the push button switch PB10.

It will also be apparent that either threading unit can be operated automatically and continuously together with the index mechanism but without the other threading unit by closing switch SW1 to position SW1B to energize relay R18 if it is desired to operate the left hand unit 134 or by closing switch SW2 to position SW2B to energize relay R19 if it is desired to operate the right hand threading unit.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine of the class described; a work gripper; first motor means operable to open and close said gripper; a first solenoid operable when energized to control said first motor means to close said gripper; a tool holding carriage; second motor means operable to move said carriage in opposite directions with respect to said gripper; a second solenoid operable when energized to control said second motor means to move said carriage in one direction; a first electric circuit including a first normally open switch for energizing said first solenoid; means for closing said first switch; a second electric circuit including a second normally open switch for energizing said second solenoid; a first normally deenergized relay, operable to open said second switch when deenergized and to close it when energized; a third circuit including a third switch operative to be closed by the closing of said gripper and to energize said first relay when closed; a fourth electric circuit including a second normally denergized relay and a fourth normally open switch adapted to be closed to energize said second relay by the movement of the carriage in said one direction; a fifth electric circuit including a fifth switch adapted to be closed by said second relay when energized and to be opened by said second relay when deenergized, said fifth circuit including a third solenoid operable when energized by the closing of said fifth switch to control said second motor means to move said carriage in the opposite direction; said second motor being ineffective when said second and third solenoids are deenergized; a sixth electrical circuit including a sixth normally open switch operable when closed to maintain said second relay energized during the movement of said carriage in the said opposite direction; means operable to keep said sixth switch closed until said carriage reaches the end of its stroke in said opposite direction, comprising a third normally deenergized relay operable to close said sixth switch only when energized, and a seventh circuit including said third relay and a holding circuit operable to hold said third relay energized during the movement of said carriage in said opposite direction; and a switch in said holding circuit operable to open to deenergize said third relay when said carriage reaches the end of the movement in said opposite direction, whereby said third solenoid is deenergized and said second motor is rendered ineffective to continue the movement of said carriage in said opposite direction.

2. In the machine described in claim 1, an eighth circuit including a fourth solenoid operable when energized to control said first motor means to open said gripper, said eighth circuit including a switch operable to be closed by said carriage when reaching the end of its movement in said opposite direction whereby said fourth solenoid is energized to open said gripper.

3. In a machine of the class described, a work gripper; a first solenoid operative when energized to close said gripper; a first electric circuit including said first solenoid and a normally open first switch for energizing said solenoid when closed; a second electric circuit including a first relay operative to close said first switch when energized and to open it when deenergized, and a second normally open switch operative when closed to energize said relay; a third electric circuit including said relay and a third normally open switch operative to be closed by said relay when energized to close a circuit for holding said relay energized; a tool holding carriage operative to reciprocate in opposite directions with respect to said gripper; means operative to move said carriage in one direction and then retract it; means responsive to said carriage when reaching the end of its stroke in said one direction to deenergize said relay, thereby opening said first switch and deenergizing said first solenoid; a second solenoid operative to open said gripper when energized; a fourth circuit including said second solenoid and a normally open fourth switch operable when closed to energize said second solenoid; and a fifth circuit including a second relay operative when energized to close said fourth switch and a normally open fifth switch operable to be closed by said carriage in reaching the end of its return stroke, said fifth circuit also including a normally closed sixth switch, said first relay being operable when energized to open said sixth switch and to close it when deenergized, whereby said second solenoid is energized to open said gripper in response to said carriage reaching the end of its return stroke.

4. In a machine of the class described, a work gripper; a hydraulic motor operable to close or open said gripper; a first solenoid operable when energized to control said motor to close said gripper; a first electric circuit including said first solenoid and a first normally open switch operable when closed to energize said first solenoid; a second circuit including a first relay, a second normally closed switch, and a third normally open switch operable when closed to energize said first relay, said third switch being connected to said relay for movement therewith to close and hold said first relay and said first solenoid energized when said first switch is open; means to momentarily open said normally closed second switch to thereby deenergize said first relay and said first solenoid; a third electric circuit including a normally closed fourth switch and a second relay connected to be energized when said fourth switch is closed, said fourth switch being connected to said first relay for movement therewith to open said fourth switch when said first relay is energized and to close said fourth switch when said first relay is deenergized; and a fifth electric circuit including a second solenoid operable when energized to control said motor to open said gripper in response to the energization of said second relay, whereby the momentary opening of said normally closed second switch is effective to deenergize said first solenoid and energize said second solenoid to open said gripper.

5. In the machine described in claim 4; a second work gripper including a second hydraulic motor operable to open and close it, a second pair of solenoids operable to control said second hydraulic motor to open and close said second work gripper, electric circuits in parallel with the aforementioned circuits and connected to said second pair of solenoids to energize them separately and including a normally closed switch having means to open it momentarily to open said second work gripper; and selecting switches in the circuits which energize said solenoids, said selecting switches being shiftable to prevent the energization of the solenoids controlling said first mentioned or said second hydraulic motor, whereby either work gripper may be operated independently.

6. In a machine of the class described, a pair of spaced machining units each operable to machine different portions of a work piece; an indexing mechanism operable to transfer a work piece from the first of said machining units to the second, said machining units being operable to simultaneously machine different portions of different work pieces in sequence; motor means operative to move said indexing mechanism through an advance stroke to simultaneously remove work pieces from said machining units while feeding new work pieces simultaneously to said machining units, said motor means also being operative to move said indexing mechanism through a return idle stroke; a first electric circuit including a first solenoid operable when energized to control said motor means to move said indexing mechanism through said advance stroke, and a normally open first switch operable when closed to energize said first solenoid; a second electric circuit including a first relay operable when energized to close said first switch, and a normally open starting switch operable to energize said first relay when momentarily closed; a third electric circuit including a normally open second switch operable when closed to keep said first relay energized after said starting switch is released, and a third switch in said third circuit operable to be opened by said indexing mechanism at the end of its advance stroke to deenergize said first solenoid; and a forth electric circuit including a second solenoid operable when energized to control said motor means to return said indexing mechanism, said fourth circuit including a fourth switch operable when closed to control the energization of said second solenoid, said indexing mechanism being operative to close said fourth switch at the end of its advance stroke.

ROY I. EYLER.

References Cited in the file of this patent
UNITED STATES PATENTS

| Number | Name | Date |
|---|---|---|
| 2,210,531 | Englbaugh et al. | Aug. 6, 1940 |
| 2,405,141 | Hibbard | Aug. 6, 1946 |